July 28, 1931. G. E. ELIA 1,816,768
TORPEDO
Filed Jan. 28, 1929 4 Sheets-Sheet 1
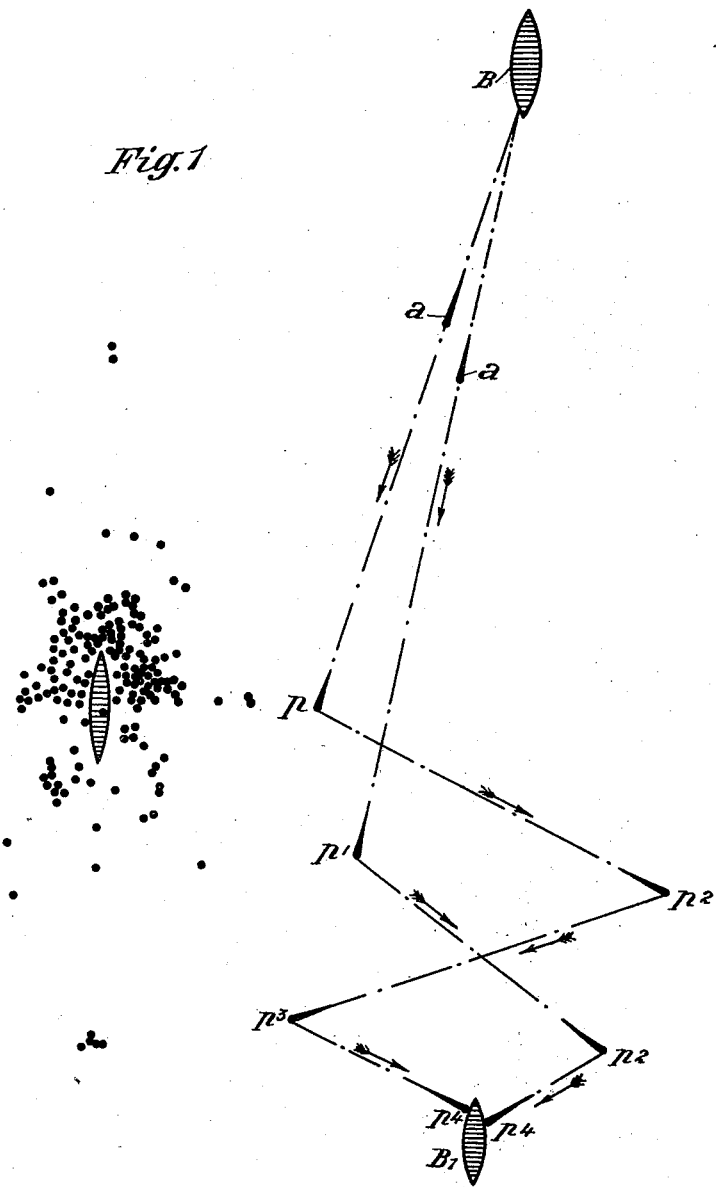

July 28, 1931.  G. E. ELIA  1,816,768
TORPEDO
Filed Jan. 28, 1929    4 Sheets-Sheet 2
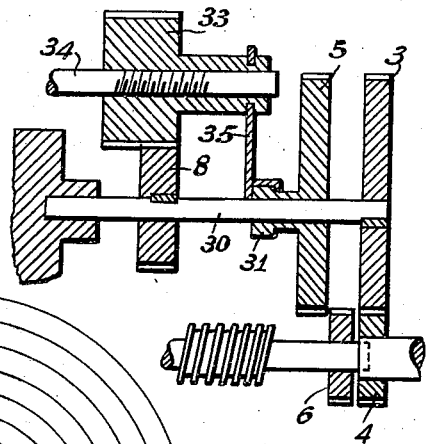
Fig. 9.
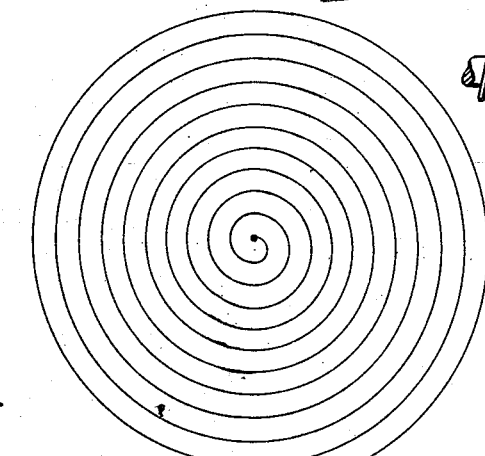
Fig. 2.
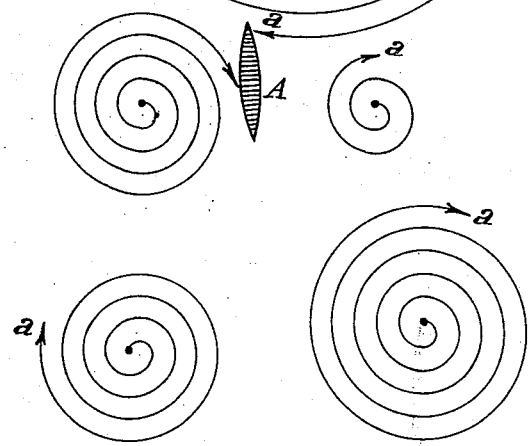
C. G. E. Elia
INVENTOR
By Marks & Clerk
Att'ys.

July 28, 1931.   G. E. ELIA   1,816,768
TORPEDO
Filed Jan. 28, 1929   4 Sheets-Sheet 4

Patented July 28, 1931

1,816,768

UNITED STATES PATENT OFFICE

GIOVANNI EMANUELE ELIA, OF ROME, ITALY

TORPEDO

Application filed January 28, 1929, Serial No. 335,683, and in France July 10, 1928.

This invention relates to torpedoes and has for its object to provide improved methods and means for effecting automatically variations in the course thereof.

The invention consists briefly in a torpedo including means whereby the course is caused to follow from the impact point of the torpedo an approximately spiral path, e. g. of about 100 meters' pitch, or a suitable zig-zag path until the propelling force of the torpedo is exhausted.

Referring to the accompanying diagrammatic drawings:—

Figure 1 is a plan view of a ship under the ordinary fire of an aircraft (not shown);

Figure 2 is a plan view of a ship under the fire of an aircraft by means of torpedoes provided with improvements according to the present invention;

Figure 5 is a plan view showing two torpedoes following zig-zag paths and discharged from one ship against another ship;

Figure 9 is a vertical sectional view of said operating device.

Referring to Figure 1, this illustrates normal conditions of a ship under fire from an aircraft, perhaps 2% only of the shots having struck the deck.

In Figure 2 five torpedoes are indicated to have been discharged from an aircraft against the ship A. The torpedoes after performing the last part of their descending flight and as soon as they reach the water begin from their points of impact with the water to follow automatically a spiral-shaped course in accordance with the present invention owing to a predetermined increasing displacement of the rudder.

In one example as applied to a torpedo $a$ having a propulsion force adequate to produce a displacement of about 15000 meters in 30 minutes, a gear system is provided whereby a constantly decreasing angular displacement of the rudder is produced in order that a spiral path having a pitch of about 100 meters will result.

Torpedoes striking the water in the vicinity of the target, owing to their continually increasing area of excursion, render insidious a considerable zone of water with the result that sooner or later the ship will almost certainly be hit.

Figure 3:
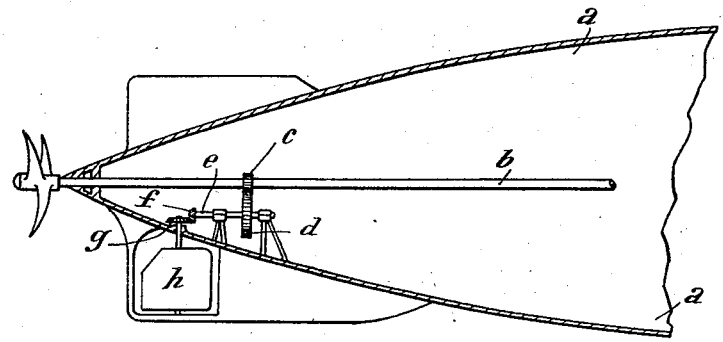
Figure 3 illustrates the stern of a common form of torpedo, the displacement of the rudder in accordance with the present invention being obtained by a gear combination controlled by the screw axle.

According to one example the desired displacement of the rudder may be obtained through gearing from the propeller shaft, as illustrated in Figure 3. According to this example a pinion $c$ keyed to the propeller shaft $b$ drives a toothed wheel or worm wheel $d$ driving the axle $e$ provided with a bevel pinion $f$ engaging a similar pinion $g$ rigid with the spindle of the rudder $h$.

Figure 4:
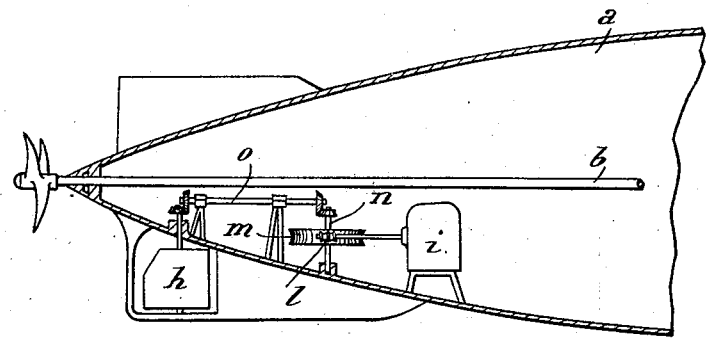
Figure 4 is a similar view to Figure 3 of a modification.
Figure 6:
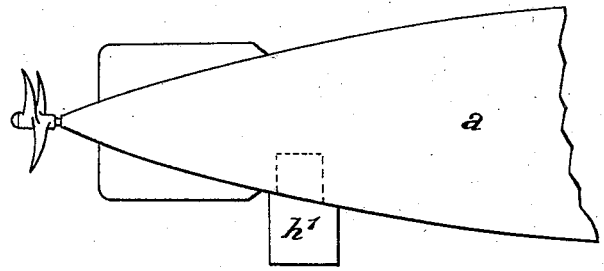
Figure 6 is a view of a torpedo's stern fitted with an auxiliary rudder.

According to the modification illustrated in Figure 4 clockwork $i$ is employed to rotate a screw $l$ engaging a wheel $m$, this wheel in its turn rotating an axle $n$ from which rotation is conveyed to the rudder bar through two sets of bevel wheels as indicated.

It is to be understood that if desired the torpedoes may be steered by rudders which are given a continuously increasing angular displacement, thus causing them to execute spiral courses towards a centre, instead of outwards from a centre.

Figure 7:
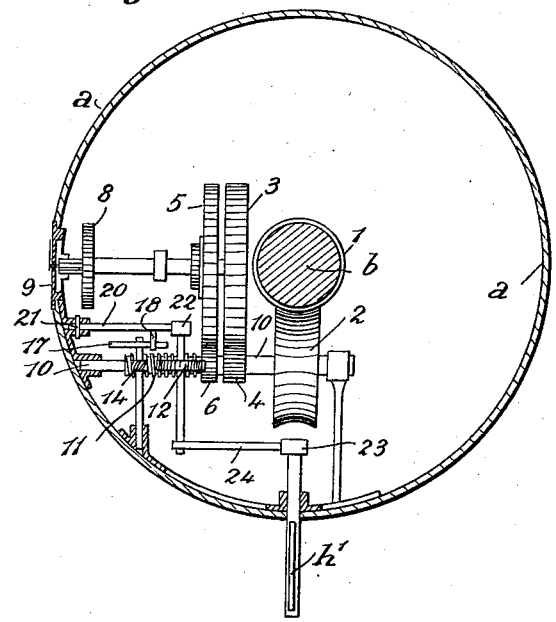
Figures 7 and 8 are elevational and plan views of a convenient form of operating device.
Figure 8:
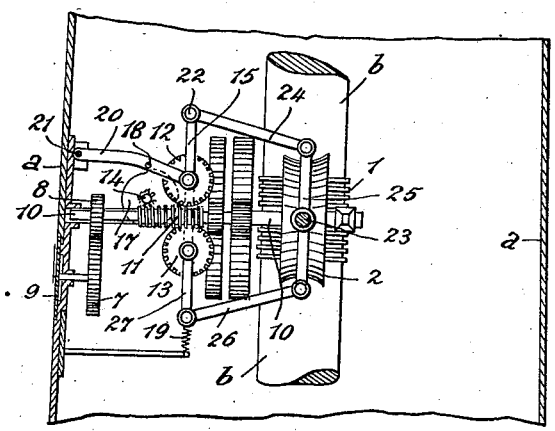

According to Figure 5 the path of a torpedo discharged from ship B against ship B¹ is rectilineal for a predetermined distance, for instance, as far as $p$ and $p'$, whereupon an auxiliary rudder $h'$, Figs. 7 and 8, is brought into operation by any convenient mechanism, the torpedoes being thus directed towards the points $p^2$, $p^3$, $p^4$, till the ship B¹ is hit.

Should the shots be missed then the torpedoes continue to travel their zig-zag course until their propelling force is exhausted.

Conveniently the necessary displacements of the rudder may be obtained by mechanism as indicated in Figures 7 and 8, wherein the axle $b$ is provided with a worm $l$ constantly engaging the worm wheel 2 rigid with the axle 10 on which the pinion 4 operating the wheel 3 is rigidly secured. The wheel 5 slides on its axle and engages pinion 6 only after a determined number of revolutions of the wheels 3, 4 and 8, that is when the torpedo has travelled a certain distance in right line. The wheel 6 is rigid with a worm 11 and both are free to rotate on the spindle 10.

The gear wheels 3 and 8 are both rigidly mounted on shaft 30 and consequently turn together continuously. This is best seen in Fig. 9. Gear wheel 5 is revoluble on shaft 30 and slidable in and out of mesh with pinion 6. A sleeve 31 terminating with a collar 32 forms part of the gear wheel 5. A pinion 33 broader than wheel 8 with which it meshes continuously, is threaded on a fixed shaft 34 and is provided with a fork 35 engaging the collar 32.

When the wheel 8 has made the predetermined portion of a revolution or number of revolutions it brings the teeth of wheel 5 into mesh with the teeth on wheel 6, thus causing the latter wheel 6 and with it the worm 11 to revolve. The worm 11 engages a pinion 14, bearing rigidly on its axle a cam 17 operating at a determined time a pin 18 rigid upon a movable arm 20. Said arm 20 is pivotally carried at one end on a fulcrum 21 and the other end carries the axle of wheel 12. Said wheel 12 has rigid with it an arm 15 which is jointed at 22 to a link 24 in turn jointed to a see-saw lever 25 carried on the rudder bar $h'$.

The remote end of the see-saw lever 25 is jointed to a further link 26 jointed in turn at 19 to an arm 27 rigid with a further wheel 13. The spindles of the wheels 12 and 13 are coupled by a link 28 shown dotted in Figure 8.

A tension spring 19 serves to maintain the pin 18 in contact with the cam 17.

Consequently at every revolution of the cam 14 the lever 20 produces the engagement of the wheels 12 and 13 alternately with the worm 11, causing the rudder to be shifted alternately to the right and to the left.

Having now particularly described and ascertained the nature of my said invention and in what manner the same is to be performed, I declare that what I claim is:—

1. Steering device suitable for self-propelling apparatus fitted with a rudder, said device comprising a gear train actuated by the propeller of the apparatus by means comprising oppositely directed arms on the rudder, a worm, a pair of worm wheels normally disengaged from said worm, and other means for connecting and disconnecting the above said means with the gear train, consisting in individual link connections between each worm gear and the corresponding arm on the rudder, and cam action actuated by said worm adapted alternately to mesh one of the said worm wheels with the said worm.

2. Steering device in accordance with claim 1, in which the means for controlling the movement of the rudder and the means for connecting and disconnecting the first means with the gear train comprise a pinion on said worm, a spindle revolved by the said gear train, a toothed wheel revolubly and slidably mounted on said spindle, the second pinion splined on the spindle, a fixed stub shaft having a threaded portion and a small gear correspondingly threaded on said stub shaft continuously meshing with said second spindle, and a fork on said small gear permanently engaging said toothed wheel to shift the same into mesh with said first pinion when said small gear advances on the stub shaft actuated by said second pinion through said threaded portion.

3. Steering device in accordance with claim 1, said means comprising oppositely directed arms on the rudder, a worm, a pair of worm wheels normally disengaged from said worm, individual link connection between each worm gear and the corresponding arm on the rudder and cam action actuated by said worm adapted alternately to mesh one of the said worm wheels with said worm, said other means comprising a pinion on said worm, a spindle revolved by said gear train, a toothed wheel revolubly and slidably mounted on said spindle, the second pinion splined on the spindle, a fixed stub shaft having a threaded portion and a small gear correspondingly threaded on said stub shaft continuously meshing with said second spindle and a fork on said small gear permanently engaging said toothed wheel to shift the same into mesh with said first pinion when said small gear advances on the stub shaft actuated by said second pinion through said threaded portion.

In testimony whereof I have hereunto set my hand.

GIOVANNI EMANUELE ELIA.